US006735708B2

(12) United States Patent
Watts, Jr.

(10) Patent No.: US 6,735,708 B2
(45) Date of Patent: *May 11, 2004

(54) APPARATUS AND METHOD FOR A COMBINATION PERSONAL DIGITAL ASSISTANT AND NETWORK PORTABLE DEVICE

(75) Inventor: La Vaughn F. Watts, Jr., Austin, TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,305

(22) Filed: Oct. 8, 1999

(65) Prior Publication Data

US 2003/0191972 A1 Oct. 9, 2003

(51) Int. Cl.7 .............................. G06F 1/26; G06F 3/00; G06F 15/00
(52) U.S. Cl. .............................. 713/323; 710/1; 712/35
(58) Field of Search ................................. 713/323, 322, 713/320, 500, 600; 710/1; 712/35

(56) References Cited

U.S. PATENT DOCUMENTS

| | | | | |
|---|---|---|---|---|
| 5,142,684 A | * | 8/1992 | Perry et al. .................. 709/102 |
| 5,163,124 A | * | 11/1992 | Yabe et al. .................. 713/324 |
| 5,590,338 A | | 12/1996 | Parks et al. .................. 395/742 |
| 5,608,884 A | | 3/1997 | Potter .......................... 395/309 |
| 5,703,790 A | * | 12/1997 | Farwell ........................ 307/31 |
| 5,742,794 A | | 4/1998 | Potter .......................... 395/500 |
| 5,745,733 A | * | 4/1998 | Robinson ..................... 710/71 |
| 5,909,559 A | | 6/1999 | So .............................. 395/307 |
| 5,910,802 A | | 6/1999 | Shields et al. ............... 345/347 |
| 5,999,997 A | * | 12/1999 | Pipes ........................... 710/303 |
| 6,438,622 B1 | * | 8/2002 | Haghighi et al. ............. 710/1 |

FOREIGN PATENT DOCUMENTS

DE   19814356 A1 * 10/1999 ............. G06F/1/18

OTHER PUBLICATIONS

IBM, Selector Mapping Table, Jul. 1, 1994, IBM Technical Disclosure Bulletin, vol. 37, Issue 7, pp. 117–122.*
"Windows CE Poised to Take Computing Everywhere," Microsoft Corporation *PressPass,* 1999, pp. 1–4, http://www.microsoft.com/presspass/features/1999/06–07wince.htm.
Chris De Herrera, "Windows CE 2.1 Information, Version 1.01 Revised May 4, 1998," 1997, 1998; 1 page, http://www.cewindows.net/wce/21/info.htm.
Chris De Herrera, "Windows CE Versions, Version 1.08 Revised Jun. 15, 1999," 1998, 2 pages, http://www.cewindows.net/wce/versions.htm.

* cited by examiner

Primary Examiner—Thomas M. Heckler
Assistant Examiner—Suresh K Suryawanshi
(74) Attorney, Agent, or Firm—Baker Botts L.L.P.

(57) ABSTRACT

A portable system is provided with both an ISPCA processing section, a non-standard personal computer architecture (NSPCA) processing section and a common section including apparatus common to both processing sections. The NSPCA processing section operates under an operating system such as the WINDOWS® CE operating system, having reduced functionality, but being capable of "instant-on" operation. The data processing system includes controllable reduced power (and reduced functionality) mode wherein only the NSPCA processing is activated. The data processing system can controllably be transferred to a higher power (and full functionality) mode operating by activating the ISPCA processing section. In this manner, the processing section that is not an integral part of the data processing system can be detachably coupled thereto.

27 Claims, 8 Drawing Sheets

APPARATUS AND METHOD FOR A COMBINATION PERSONAL DIGITAL ASSISTANT AND NETWORK PORTABLE DEVICE

BACKGROUND OF THE INVENTION

1. Field of the Invention

This invention relates generally to data processing systems and, more particularly, to portable data processing systems. In general, portable data processing systems provide either specialized functionality and relatively long interval between battery charges, or the portable devices provide a full range functionality with relatively short battery charge lifetime. In addition, the portable data processing systems with specialized functionality are available for user interaction immediately upon activation of the system.

2. Description of the Related Art

Currently, two types of portable data processing systems are available. The industry standard personal computer architecture (ISPCA) system is a fully functional data processing system, typically having the same functionality as a desktop PC or a workstation PC. The portable ISPCA system is typically referred to a notebook or laptop computer. The ISPCA system type runs under any number of standard operating systems, such as one of the releases of Windows by the Microsoft corporation. In implementing the ISPCA in a portable unit, several relatively undesirable features are apparent. First, the batteries of the portable ISPCA device must be recharged after a relatively short time, typically, in the order of a few hours. Despite improvements in battery technology, the quest for lighter and more compact portable units have tended to reduce the space allocated to the batteries so that time between charging of the batteries has not been significantly improved. The batteries used in the portable ISPCA devices are capable of relatively rapid charging however. Second, as with the desktop PC unit and the workstation PC from which they are derived, the operating system needed for the ISPCA system requires a relatively long time from the activation of the power switch to the time when the processing system is available for actual computation. However, the ISPCA systems have remarkable flexibility and can provide processing capability of extraordinary power.

More recently a non-industry standard personal computer architecture (NSPCA) system has been developed to take advantage of the Windows CE operating system. The Windows CE operating system, in conjunction with NSPCA system, permits a reduced or specialized functionality data processing system. Typically, these units are relatively small and are marketed by such names as Palm Pilot, hand-held units, personal calendars, etc. These units can perform a variety of useful functions such as arrange calendars, schedule appointments, send and receive e-mail, provide presentations, create word documents, and provide communications. The Windows CE operating system can permit exchange of files between the NSPCA/Windows CE systems and a ISPCA system with a Windows files. While the reduced functionality can be disadvantage of the NSPCA/Windows CE system, this system has several advantages. First, the time between charging of the batteries can be greatly extended, a result of the reduced functionality and the absence of disk storage units. (The Windows CE system has considerable flexibility with respect to expansion. As the system is expanded, the power requirements increase, and the battery charging cycle is decreased.) However, the time for charging the batteries, at least on the presently available NSPCA systems require a relatively long period of time. Furthermore, the NSPCA system has the memory loaded in the memory circuit, such as a flash memory, as contrasted with a disk drive for the ISPCA devices. For reasons related to testing, to flexibility and to backward compatibility, a relatively large amount of time does elapse between the activation of a ISPCA device and when the device is functional. In contrast, the NSPCA system is fully functional from the time that it is activated.

A need has been felt for a portable data processing unit having the desirable of features of both the ISPCA systems and of the NSPCA systems In particular, the portable data processing unit would have the feature of an expanded time between battery charges. Another feature of the portable data processing unit would be the availability for performing user-directed processing functions as soon as the power is applied to the processing unit, i.e., the instant-on feature. Another feature of the portable processing unit would be the capability of performing essentially all of the processing functions available to the full-function processing unit. Still another feature of the present invention would be a low-power, reduced functionality mode of operation and an increased power, full functionality mode of operation. Yet another feature of the portable data processing system would be the ability to control mode of operation, i.e., a low power, reduced-functionality mode or a high power, full-function mode of operation.

SUMMARY OF THE INVENTION

The aforementioned and other features are accomplished, according to the present invention, by providing a data processing system that includes an ISPCA processing section, a NSPCA processing section and a section in common with the other two processing sections. For applications not requiring the full functionality of the ISPCA processing section, a user can select for activation the NSPCA processing section in conjunction with the common section, the NSPCA processing section and the common section operating in reduced power mode. When expanded functionality is required of the data processing system, the ISPCA section and the common section are activated, the data processing system operating in a higher power mode. Both the reduced power and the higher power mode are user selectable. For a limited amount of time, both the ISPCA and the NSPCA can be activated at the same time. This mutual activation allows the data transfer between the system (i.e., typically referred to as the synchronization of data). The user has the option of transferring control of the current viewable display, control of the keyboard and mouse input devices and control of the shared common logic apparatus and shared peripheral devices. During power-up, the NSPCA processing section and the common section of the data processing system are automatically activated, thereby providing an instant-on function. However, the user has the option as to how to configure the data processing system default parameters (e.g., the battery mode only). When the processing unit is coupled to an external power source, or when the processing unit is coupled or "docked" to another processing unit, the ISPCA section can be simultaneously activated. The common section provides two principal features for the data processing system. First, the mutually shared resources of the ISPCA processing unit and the NSPCA processing unit are part of the common section. In addition, the common section is responsible for the synchronization of the ISPCA processing section and the NSPCA processing sections when the activation changes between the two sections. In particular, files and information used by both processing portions are equalized subject to constraints imposed by the difference in memory size of the two data processing unit sections. The battery system of the combined data processing system is similar to a PC processing unit, thereby permitting a rapid charging cycle. The shared resources of the common section unit provide flexibility in the design of the processing system. For example, if the application to which the combined data processing system is addressed has limited need for the full functionality of the ISPCA processing section or if the combined data processing system will only occasionally be used as a portable data processing system, the amount of battery required can be reduced. In addition, the use of the common section provides a convenient scalability for the data processing system. Any added apparatus does not have to be included in the design of the separate processing units, but can be added to the common section. Thus, in designing a system with specialized application, the apparatus required to implement the specialized application can reside in the common section. Two embodiments of the present invention are envisioned. The first embodiment involves both the ISPCA apparatus and the NSPCA apparatus included as an integral part of the data processing system. In the second embodiment, the data processing system is basically an ISPCA processing unit or a NSPCA processing unit with a coupling mechanism. The coupling mechanism permits a processing section of the type not part of the original data processing system to be coupled thereto. NSPCA apparatus to be coupled to ISPCA apparatus as a mini-PCI system board is an further option. Either of the embodiments can be considered to have three sections, an ISPCA section, a NSPCA section, and a common section. The common section can optionally include the peripheral devices.

BRIEF DESCRIPTION OF THE DRAWINGS

The present invention may be better understood, and its numerous objects, features, and advantages made apparent to those skilled in the art by referencing the accompanying drawings.

FIG. 3A is a block diagram of the incorporation of the display apparatus for a data processing system according to one embodiment of the present invention, while

FIGS. 6A and 6B illustrate the possible arrangements of the data processing system according to the present invention, while

The use of the same reference symbols in different drawings indicates similar or identical items.

DESCRIPTION OF THE PREFERRED EMBODIMENT(S)

1. Detailed Description of the Drawings

Figure 1:
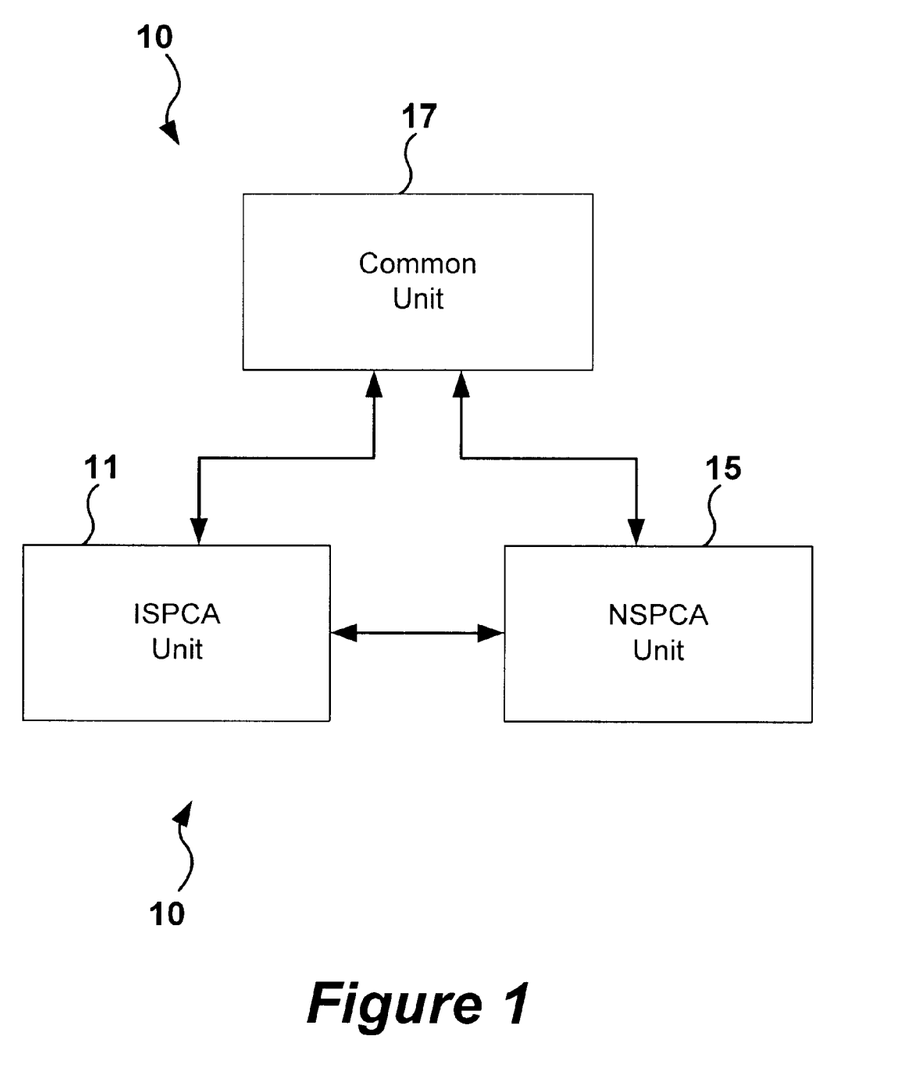
FIG. 1 is block diagram of the major divisions of the data processing system according to the present invention.

Referring to FIG. 1, a block diagram of the major areas of the data processing system 10 according to the present invention. The common unit 17 includes the apparatus that is common to the two other portions of the data processing system. As will be seen, the common unit typically includes the display unit and the power supply. The industry standard personal computer architecture (ISPCA) unit 11 includes a ISPCA central processing unit and the input/output devices that normally control the interchange of signals with the central processing unit. For example, a disk drive system is normally included in the ISPCA section. For the NSPCA architecture, a memory unit, such as flash memory unit or read-only memory (ROM) unit is coupled to the central processing unit.

Figure 2:
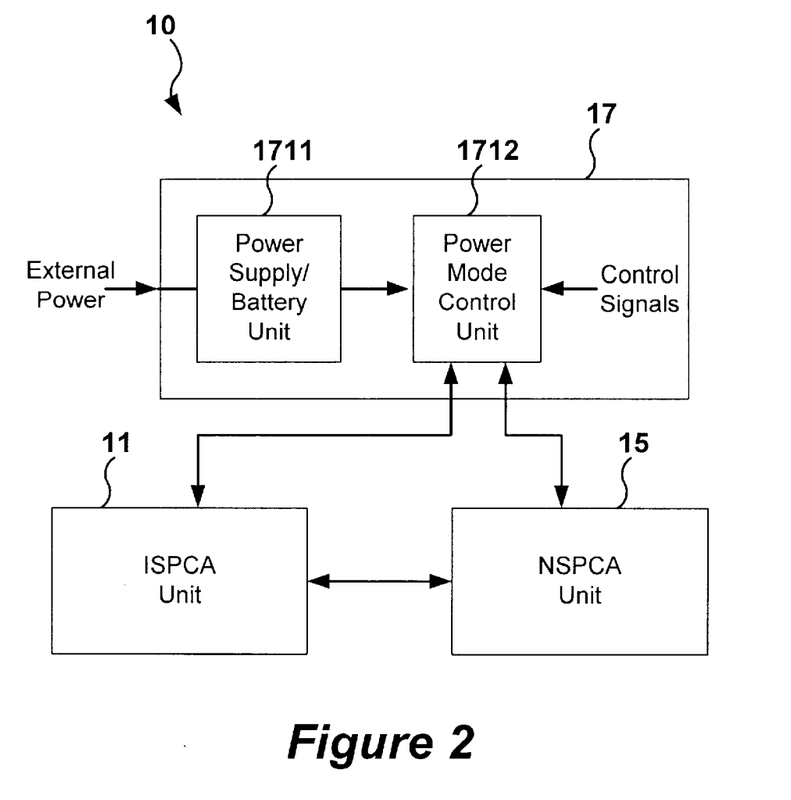
FIG. 2 is a block diagram of the components for energizing the data processing system according to the present invention.

The power supply/battery unit is part of the apparatus located in the common section. Referring to FIG. 2, the power supply/battery unit 1711 is shown as a part of the common section 17. The power supply/battery unit 1711 can receive external power. The external power not only provides power for the data processing system 10, but can also charge the batteries. The battery charging circuit is part of the power supply/battery unit 1711 in FIG. 2. In addition, common section 17 includes a power mode control unit 1712. The power mode control unit is responsive to control signals determining the distribution of power to the data processing system 10. For example, a sensor switch responsive to a position of a lid of a portable data processing system can activate the power mode control unit 1712, thereby distributing power to the common section 17 and to the remainder of the data processing system 10. Typically, to provide an instant-on capability, the sensor switch will cause the power mode control unit to provide power to the NSPCA unit 15. However, the power mode control unit 1712 can distribute power to either the ISPCA unit 11 or to the NSPCA unit 15 or to both units in response to control signals.

Figure 3A:
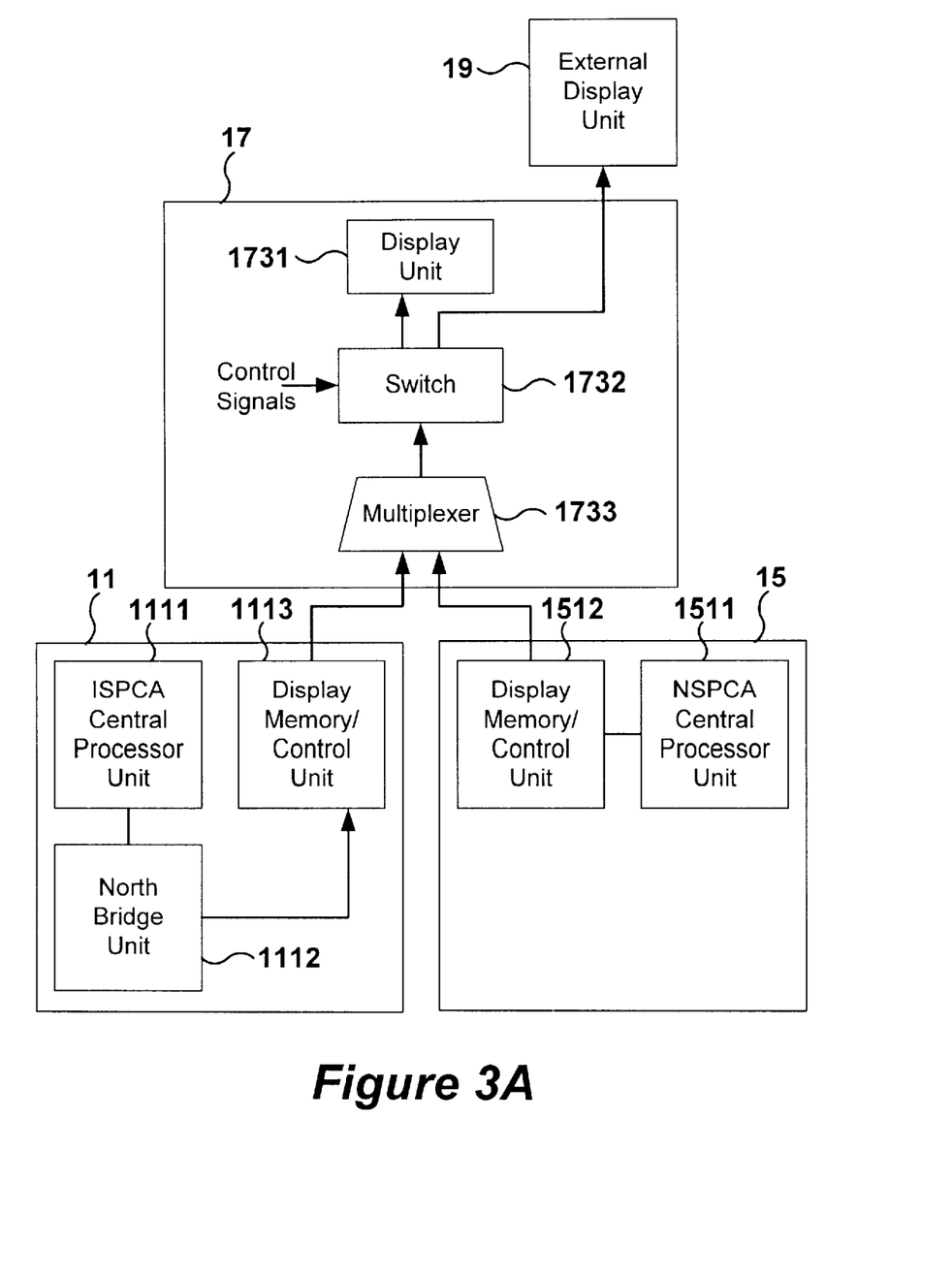

Referring to FIG. 3A, a display unit 1731 is included in the common section 17. The signals for the display unit are generated in the ISPCA section 11 by ISPCA central processing unit 1111. The display unit signals are transferred to the north bridge unit 1112 and then to the display memory/control unit 1113. From the display memory/control unit 1113, the display signals are applied to one set of input terminals of a multiplexer 1733 in the common section 17. Display signals are also generated by NSPCA central processing unit 1511 in the NSPCA section 15. The display signal generated by the NSPCA central processing unit 1511 are applied to the display memory/control unit 1512. The signals from the display memory/control device 1512 are applied to a second set of input terminals of the multiplexer 1733 in the common section 17. The multiplexer 1733 selects the signals applied to one set on input terminals of the multiplexer, the selection based on control signals applied to multiplexer 1733. The output signals of the multiplexer 1733 are applied to input terminals of switch 1732. In response to control signals, the display signals can be applied either to the display unit 1731 included in the common section 17 or can be applied to the external display unit 19. This selection becomes important because the display unit associated with the NSPCA unit will typically be a reduced capability screen. While the signals for the reduced capability screen have drive (at least portions of the) display with expanded capabilities, signals associated with the expanded screen capability can not effectively drive the display unit with the reduced screen capability.

Figure 3B:
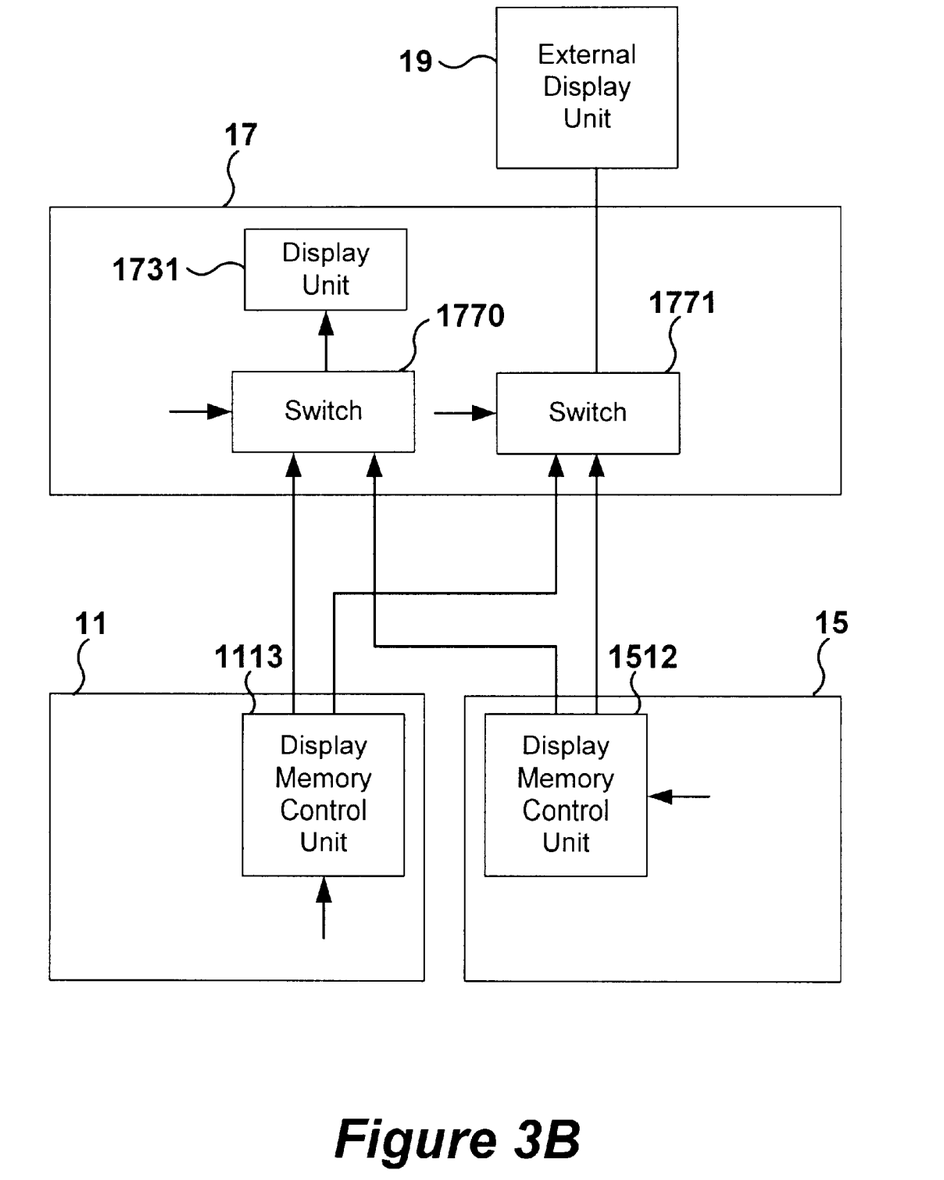
FIG. 3B is a block diagram of the incorporation of the display apparatus for a data processing system according to second embodiment of the present invention.

Referring to FIG. 3B, a different embodiment involving the display units is illustrated. In this embodiment, the both the display memory control unit 1113 associated with the ISPCA processing unit (1111) and the display memory control unit 1512 associated with the NSPCA processing unit (1511) provide signals capable of driving both the (internal) display unit 1731 and an external display 19. With these signals available, only switches 1770 and 1771 are needed to determine which display unit will be activated.

Figure 4:
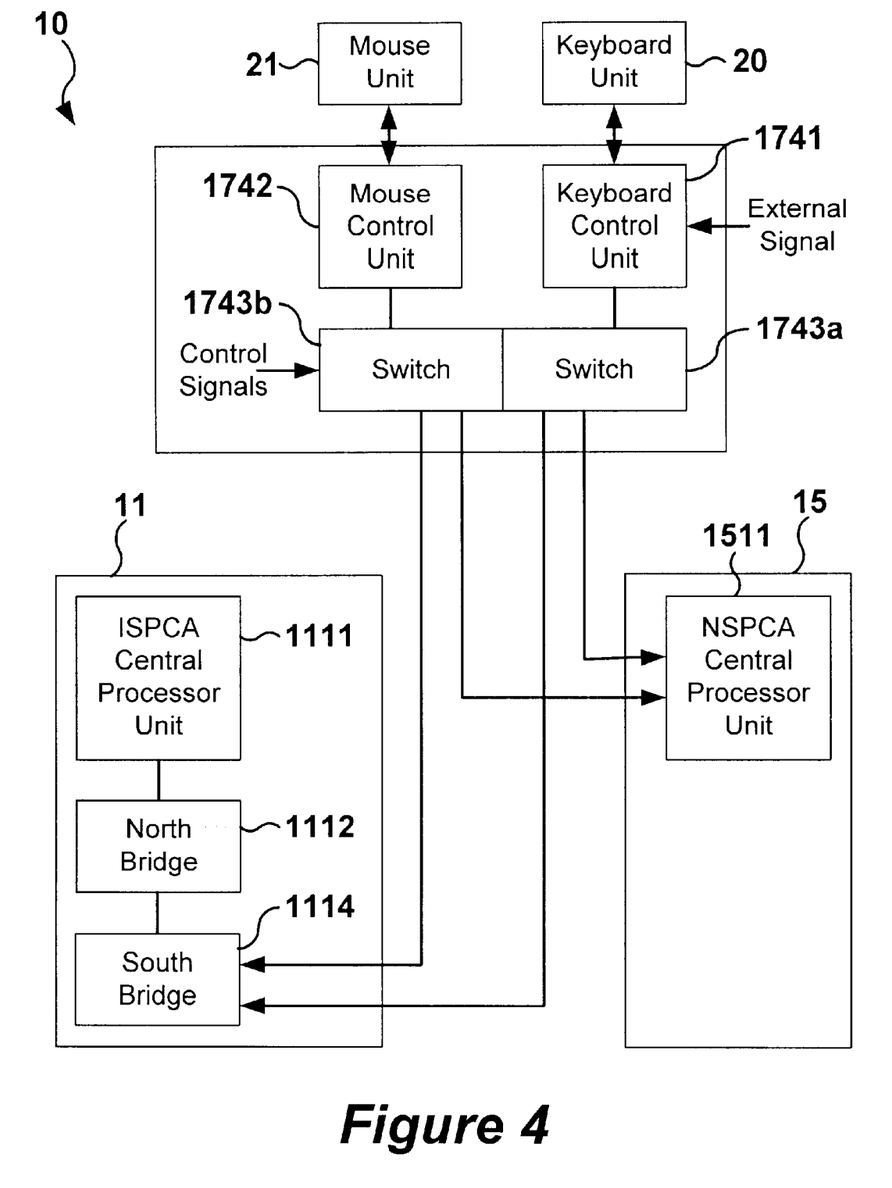
FIG. 4 illustrates the relationship of the keyboard/mouse input devices to the data processing system of the present invention.

Referring to FIG. 4, a keyboard 20 and mouse 21 coupled to the data processing system 10 through the common section is shown. The keyboard 20 is coupled to a keyboard control unit 1741. The keyboard control unit 1741 applies the scanning signal to and receives the matrix signals from the keyboard 20. The keyboard control unit can also receive external signals, the function of which will be described below. The output signals from the keyboard control unit 1741 are applied top switch 1743a. The mouse unit 21 exchanges signals with a mouse control unit 1742. The mouse control unit applies output signals to switch 1743b. Switches 1743a and 1743b have control signals applied thereto. The control signals determine whether the keyboard control unit output signals and the mouse control unit output signals are applied to the ISPCA unit 11 or to the NSPCA unit 15. When the output signals are applied to the ISPCA unit 11, these signals are applied to a south bridge unit 1114 of the ISPCA unit 11. The keyboard and mouse output signals are then applied to the north bridge unit 1112, and then to the ISPCA central processing unit 1111. When the mouse and keyboard control signals are applied to the NSPCA unit 15, these signals are applied directly to the NSPCA central processing unit 1511. In some NSPCA units, the input unit and the display unit are included in the same unit, e.g., touch-screen entry and display devices. In this embodiment, the foregoing description is still applicable.

Figure 5:
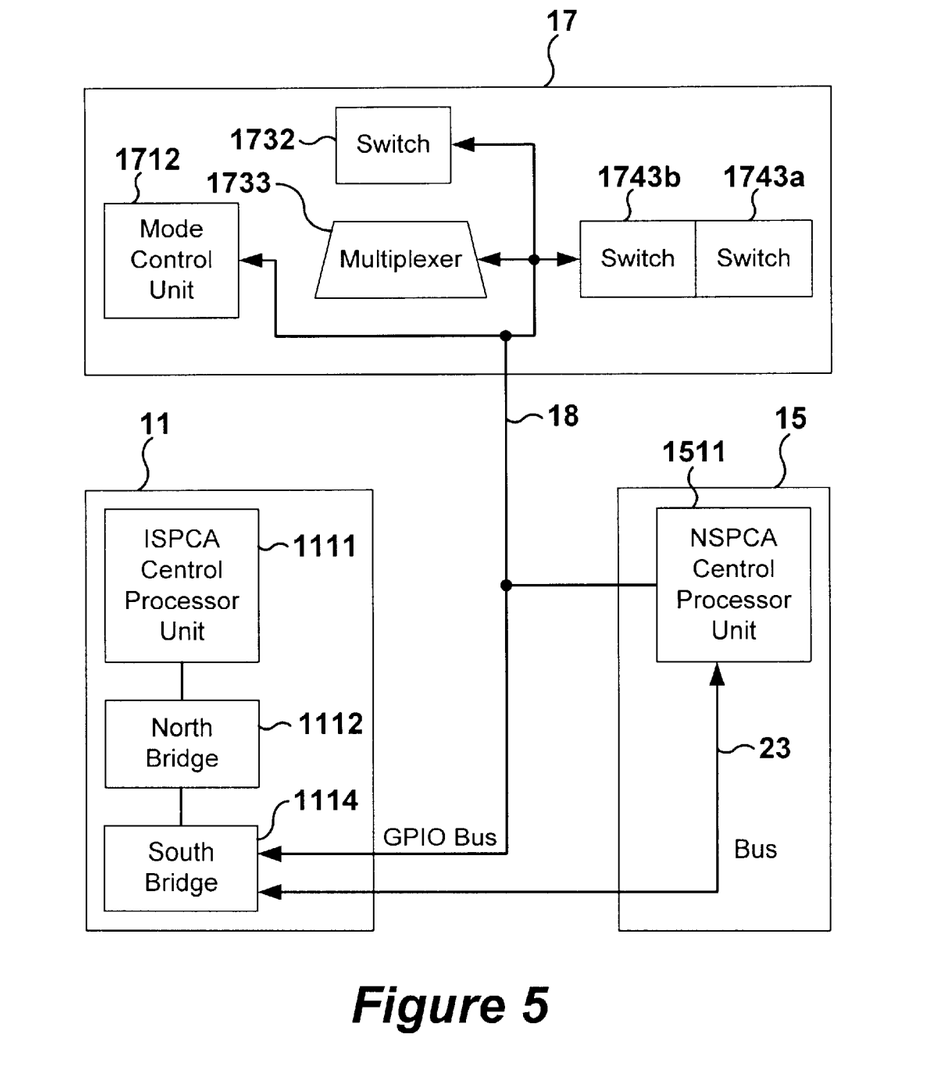
FIG. 5 illustrates the distribution of control signals in the data processing system according to the present invention.

Referring to FIG. 5, the distribution of control signal is illustrated. In the preferred embodiment, the control signals are transmitted over the general purpose input/output (GPIO) bus 18. The GPIO bus 18 is coupled to the ISPCA central processing unit 1111 through the north bridge 1112 and the south bridge 1114. The GPIO bus 18 is coupled directly to the NSPCA central processing unit 1511. In the common section, the GPIO bus is coupled to the power control unit 1712, to the switch 1732 and multiplexer 1733 associated with the display unit 1731 (and external display 19) shown in FIG. 3B, and to the switches 1743a and 1743b associated with the keyboard unit 20 and mouse unit 21 shown in FIG. 4. Also shown in FIG. 5 is bus 23 extending from the NSPCA central processing unit 1511 of the NSPCA processing section 15 to the south bridge 1114 of the ISPCA processing section 11. Bus 23, which may for example be a peripheral control interface (PCI) bus, a low pin count (LPC) bus, an XT bus, a universal system bus (USB), etc., permits the exchange of signals between the two processing sections. The purpose of this bus will be discussed below.

Figure 6A:
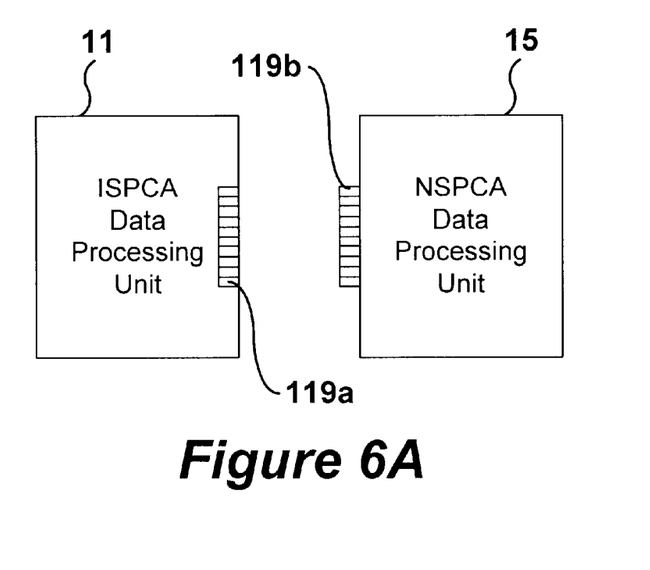
Figure 6B:
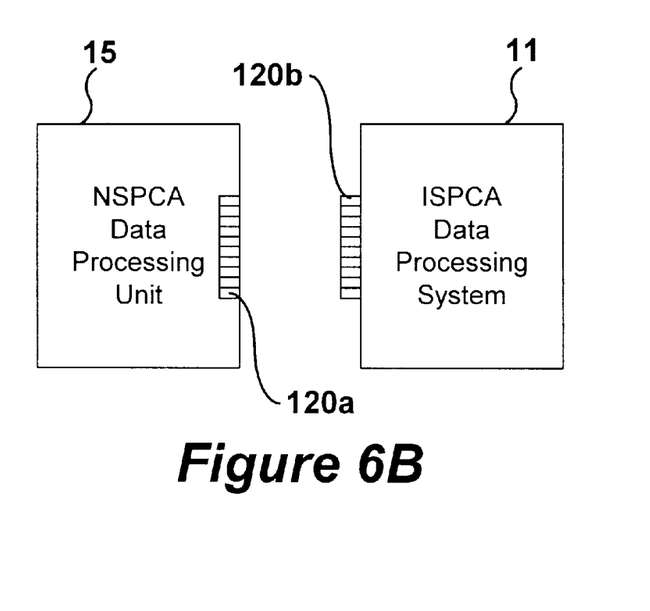
Figure 6C:
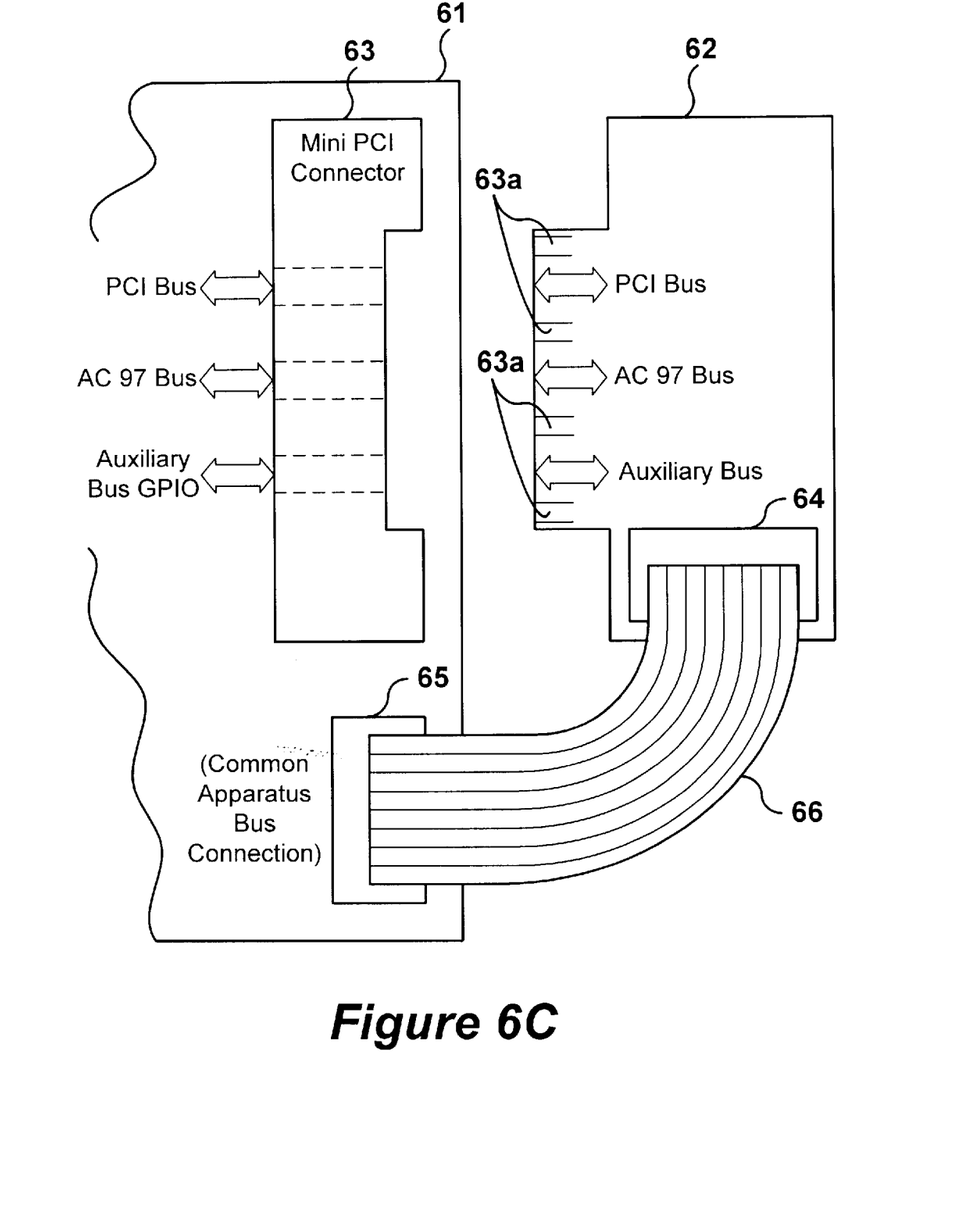
FIG. 6C illustrates apparatus for coupling the ISPCA unit and the NSPCA unit.

Referring to FIG. 6A and FIG. 6B, two further embodiments of the present invention are shown. In FIG. 6A, the arrangement wherein an ISPCA unit 11 serves as a mother-board to which a NSPCA unit 15 can be detachable coupled is illustrated. The connector mechanism is shown symbolically in FIG. 6A as 119A and 119B. However, the mother-board could have the NSPCA data processing unit, while the ISPCA data processing unit is coupled thereto. Referring to FIG. 6C, one technique for providing the electrical coupling between the two data processing unit is shown. On the mother-board 61, a mini PCI connector is attached. The connector 63 includes terminals, for example, for a PCI bus, an AC97 bus and an auxiliary bus (the auxiliary bus can be the GPIO bus). On the board 62 that includes the data processing system to be attached to mother board, terminals 63a, adapted to be engaged by the mini PCI connector, are coupled to the same busses on circuit board 62. As will be clear, many of the signals important for the operation of the present invention are not present. In order to accommodate these signals, a connector 65 is attached to the mother-board 61, while a compatible connector 64 is attached to the circuit board 62. The terminals of these two connectors distribute display signals, input device (i.e., mouse, keyboard, touch pad) signals and power supply/battery signals.

2. Operation of the Preferred Embodiment

The data processing system of the present invention has several advantages over other portable data processing system. The presence of the two operating systems and the separate sets of apparatus permits the apparatus to provide the user with instant-on, although, functionality. Typically, a laptop/notebook (ISPCA) processing unit will begin to power-up as soon as the cover is opened and/or when the power switch is activated. In response to this activation event, the NSPCA processing unit is ready for user interaction without noticeable time delay. Thus, the user has access immediate access to the features supported by the NSPCA processing unit. In the present invention, the NSPCA processing section is activated in response to the activation event, e.g. opening of the cover of the processing system. When the data processing system is being energized by batteries, only the NSPCA processing section is activated. In this manner, should the functionality of the NSPCA processing

TABLE 1

|  | ISPCA DEVICE | | NSPCA DEVICE |
| --- | --- | --- | --- |
|  | ACTIVE | STAND-BY | ACTIVE |
| Initialize System with No External Power Applied | No | No | Yes |
| Initialize System with External Power Applied or Docked | No | Yes | Yes |
| Change From NSPCA Mode to ISPCA Mode (No External Power) | Yes | — | No |
| Change From NSPCA Mode to ISPCA Mode (External Power or Docked) | Yes | — | Optional |
| Change from ISPCA Mode to NSPCA Mode (No External Power) | No | No | Yes |
| Change from ISPCA Mode to NSPCA Mode (External Power or Docked) | No | Yes | Yes | section be sufficient for the user requirements, then the ISPCA processing section need not be activated and the data processing unit can remain in a reduced power mode, thereby expanding the operating lifetime of the current battery charge. Should the enhanced functionality of the ISPCA processing section be required, the user can enter the command that activates/powers-up the ISPCA processing sections. When the enhanced functionality is no longer required, the user can transfer the activation of the data processing unit to the NSPCA processing section. Such an activity will once again allow the data processing system to enter the reduced power mode.

Referring to Table 1, the power distribution within the portable processing system is summarized for a variety of situations. In the present invention, the typical strategy is to conserve the charge on the batteries to the greatest extent possible. When the system is initialized and external power is not applied to the system, the NSPCA device is activated, but the ISPCA device remains without power, i.e., neither in a active mode nor in a stand-by mode. The implication is that, should the ISPCA device not be activated, a delay will be encountered in initializing the ISPCA device during the later activation. On the other hand, when external power is being applied to the portable processing system, the ISPCA device receives power and is placed on stand-by, i.e., the boot procedure is executed. In this manner, when the ISPCA device is activated, the boot procedure has been run and the ISPCA device is ready for immediate interaction with the user. In this situation, the external power is available so that the initialization and the holding on stand-by of the ISPCA device will not cause a drain of power. Similarly, when the portable processing system is coupled to a docking port, the ISPCA device will be booted and placed in a stand-by mode. After the activation of the NSPCA device, when activation is switched to the ISPCA device, the NSPCA device will have power removed therefrom, i.e., will be in active in a non-stand-by mode when external power is not applied to the system. As indicated by Table 1, when external power is being applied to the system, it is a "don't care" situation with respect continuing to apply power to the NSPCA device when the NSPCA device is no longer activated. The ISPCA device will be switched from a stand-by mode to an active mode, when external power is applied to the system and is switched from a non-powered mode to an active mode when external power is not being applied to the system. As indicated above, the delay in booting the ISPCA device, when external power is not applied to the system, is the part of the cost of conserving the battery charge. When the activity required by to be performed by the ISPCA device is completed, the activation in the portable processing system is returned to the NSPCA device. At this point, the ISPCA will be placed in a stand-by mode when external power is being applied to the portable processing system and the ISPCA device will have power removed therefrom when external power is not be applied to the portable processing system. (As will be clear, because the NSPCA device has a lower power consumption, power can always be applied to the NSPCA device and the device isolated by the multiplexers. Aside from the power consumption considerations, because the NSPCA device is essentially "instant-on", as contrasted with the ISPCA device that has an appreciable power-up time delay, a stand-by mode is not required.)

As indicated above, the advantages of the present invention can still be achieved by including in a data processing system either a ISPCA processing section or a NSPCA section along with a common section as an integral part of the data processing system. A coupling mechanism can then be attached to data processing system. By means of the coupling, a data processing section having a different architecture can be coupled to the data processing system. In this manner, a data processing system can achieve the same advantages as the data processing system having both the ISPCA and the NSPCA processing sections as an integral part of the data processing system. One advantage of this embodiment is that the second processing architecture is not required to be included with the data processing system and can be treated as an add-on device.

The use of the common section is also useful in providing a scaleable data processing system, that is a data processing system that can be expanded to meet specialized requirements. The NSPCA processing section and the ISPCA processing section hardware implementations can be optimized so that, except for software support and except for appropriate buses to exchange signals between the common section and the processing section, the only changes that need to be made are in the common section. For example, if a modem is required for the data processing system, then the modem can be added to the common section along with the selection apparatus that permits the mode to be coupled to one of the processing sections.

Referring once again FIG. 5, the bus 23 coupling the south bridge of the ISPCA processing section and the NSPCA central processing unit of the NSPCA processing section, permits files to be exchanged between the ISPCA processing section and the NSPCA processing section. In the second embodiment as shown in FIG. 6C, the mini PCI connector provides for the exchange of this information. This information exchange is important because selected files, for example a user calendar, must be the same for both processing sections. However, one processing section may change this file while the other section is not activated. When control is changed between the processing sections, the files of the formerly inactive processing section must made updated and made consistent with the files of the formerly active processing section. Because the memory of the NSPCA processing section will generally be smaller than the memory of the ISPCA processing section, the files will generally not be identical. However, the same procedures and protocols that permit the exchange of these files between an independent ISPCA data processing system and an independent NSPCA data processing system are applicable to the transfer of files between the ISPCA processing section and the NSPCA processing section.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. A portable data processing computer, comprising:
   an industry standard personal computer architecture (ISPCA) data processing section within said computer including at least an ISPCA central processing unit;
   a non-industry standard personal computer architecture (NSPCA) data processing section within said computer including at least an NSPCA central processing unit; and
   a common section having apparatus used by both the ISPCA data processing section and the NSPCA data processing section, wherein the ISPCA data processing unit and the NSPCA data processing unit are detachably coupled, and wherein the common section includes at least a power supply/battery unit, the power supply/battery unit having a first mode of operation wherein only the NSPCA data processing system and the common section have power applied thereto;
   wherein the power supply has a second user selected mode of operation wherein the ISPCA data processing unit and the common section have power applied thereto.

2. The portable data processing computer as recited in claim 1, wherein the portable data processing unit automatically enters the first mode of operation when initially activated.

3. The portable data processing computer as recited in claim 1, wherein the transition between the two modes can occur during the power-up of the portable processing system or during operation of the processing system.

4. The portable data processing computer as recited in claim 1, wherein the common section is scaleable.

5. The portable data processing computer as recited in claim 1, wherein the common section includes a display, wherein at least one control signal determines whether the image on the display unit originates from the ISPCA central processing unit or from the NSPCA central processing unit.

6. The portable data processing computer as recited in claim 1, wherein the common section includes an input device control unit, at least one control signal determining whether signals from the input device control unit are applied to the ISPCA central processing unit or to the NSPCA central processing unit.

7. The portable data processing computer as recited in claim 1, wherein apparatus shared by the ISPCA processing section and the NSPCA processing section is located in the common section.

8. The portable data processing computer as recited in claim 7, wherein the common section includes a display unit and control apparatus for user-input devices.

9. The portable processing computer as recited in claim 1 wherein the portable processing unit includes a mode of operation for exchanging data and information between the (ISPCA) data processing section and the (NSPCA) data processing section.

10. The portable processing computer as recited in claim 1 further comprising:
    a motherboard, wherein the NSPCA section is located on the motherboard, the motherboard including a first connector, the ISPCA section having a second connector, wherein the first connector can be detachably coupled to the second connector, the first and second connectors permitting the ISPCA section and the NSPCA section to exchange signals.

11. The portable processing computer as recited in claim 1 further comprising:
    a motherboard, wherein the ISPCA section is located on the motherboard, the motherboard including a first connector, the NSPCA section having a second connector, wherein the first connector can be detachably coupled to the second connector, the first and second connectors permitting the ISPCA section and the NSPCA section to exchange signals.

12. The portable processing computer as recited in claim 1 wherein the ISPCA section, the NSPCA section, and the common section are located on the same motherboard.

13. A portable computer, comprising:
    a central processing unit and associated apparatus within said computer having a unit selected from the group consisting of an industry standard personal computer architecture (ISPCA) unit and a non-standard personal computer architecture (NSPCA) unit;
    a common section including at least a power supply/battery unit for energizing, by a user, the central processing unit wherein the non-selected architecture device is detachably coupled to the selected architecture device; and
    a connector for coupling the non-selected unit to the common section and to the central processing unit and associated apparatus.

14. The portable computer as recited in claim 13 wherein the power supply/battery energizes the non-selected architecture device in response to control signals.

15. The portable computer as recited in claim 13, wherein the common section includes a display unit and a controller for the user-input device, wherein the display unit and the controller for the user-input device can be coupled to the non-selected device in response to control signals.

16. The portable computer system as recited in claim 13 wherein the selected and the non-selected architecture device can exchange signal for coordination of data files.

17. The portable computer as recited in claim 13 further comprising:
    a motherboard, wherein the selected section is located on the motherboard, the motherboard including:
        a first connector, the non-selected section having a second connector, wherein the first connector can be detachably coupled to the second connector, the first and second connectors permitting the selected unit and the non-selected unit to exchange signals.

18. The portable computer as recited in claim 13 wherein the selected unit is an ISPCA unit.

19. The portable computer as recited in claim 13 wherein the selected unit is an NSPCA unit.

20. A portable computer, comprising:
    a central processing unit and associated apparatus within said computer having a unit selected from the group consisting of an industry standard personal computer architecture (ISPCA) unit and a non-standard personal computer architecture (NSPCA) unit; and
    a detachable connector for coupling and decoupling the non-selected unit to the selected unit; the non-selected unit including a common unit, the common unit determining to which of the selected and not selected unit power is applied, the selection unit being selected by a user.

21. The portable computer system as recited in claim 20 wherein the selected unit is an ISPCA unit.

22. The portable computer as recited in claim 20 wherein the selected unit is an NSPCA unit.

23. A method of providing an instant-on capability and increased battery-operated lifetime in an industry standard (ISPCA) portable processing system within a computer, the method comprising:
    in the portable processing system, detachably adding a non-industry standard processing (NSPCA) unit;
    providing a common section, the common section including components used by both the ISPCA unit and the NSPCA unit; and
    providing a power unit controllably applying power by a user to at least one of the ISPCA along with the common section unit and the NSPCA unit along with the common section.

24. The method as recited in claim 23 further comprising:
    during power up of the processing system, applying power to the NSPCA unit and the common section.

25. The method as recited in claim 23 further comprising:
    coordinating files between the NSPCA unit and the ISPCA unit when power is switched from one unit to the other.

26. The method as recited in claim 23 further comprising:
    locating the NSPCA unit and the ISPCA unit on the same motherboard.

27. The method as recited in claim 23 further comprising:
    increasing the functionality of the portable processing system by adding components to the common section.

* * * * *